(12) United States Patent
Yu et al.

(10) Patent No.: US 8,047,499 B2
(45) Date of Patent: Nov. 1, 2011

(54) SUPPORT STAND ASSEMBLY AND DIGITAL PHOTO FRAME USING SAME

(75) Inventors: Hai-Yang Yu, Shenzhen (CN);
Er-Zheng Zhao, Shenzhen (CN);
Hong-Wei Zhu, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 289 days.

(21) Appl. No.: 12/409,507

(22) Filed: Mar. 24, 2009

(65) Prior Publication Data
US 2010/0038515 A1    Feb. 18, 2010

(30) Foreign Application Priority Data
Aug. 13, 2008    (CN) .......................... 2008 1 0303722

(51) Int. Cl.
*A47G 29/00* (2006.01)
*F16M 11/00* (2006.01)

(52) U.S. Cl. .......................... 248/688; 248/472; 248/455
(58) Field of Classification Search .................. 248/688, 248/472, 455, 454
See application file for complete search history.

(56) References Cited

U.S. PATENT DOCUMENTS

| 6,003,831 | A  | * | 12/1999 | Coleman ....................... | 248/688 |
| 7,011,285 | B2 | * | 3/2006  | Wang et al. ................... | 248/673 |
| 2002/0088918 | A1 | * | 7/2002 | Uto et al. ..................... | 248/688 |
| 2005/0253040 | A1 | * | 11/2005 | Yang ............................ | 248/688 |

* cited by examiner

*Primary Examiner* — Amy J. Sterling
(74) *Attorney, Agent, or Firm* — Altis Law Group, Inc.

(57) ABSTRACT

A support stand assembly includes a base, a stopper, a guiding member, a connecting member, a supporting member, and a resilient member. The guiding member, the connecting member, and the supporting member are movably disposed on the base. The resilient member is disposed between the guiding member and the base. The stopper is rotatable disposed in the base. The guiding member is engaged with the stopper. The connecting member abuts the guiding member. The supporting member is pivotally connected with the connecting member.

20 Claims, 6 Drawing Sheets

SUPPORT STAND ASSEMBLY AND DIGITAL PHOTO FRAME USING SAME

BACKGROUND

1. Technical Field

Embodiments of the present disclosure relate to support stand assemblies, and particularly to a support stand assembly for supporting a digital photo frame.

2. Description of the Related Art

It is common for people to take their portable electronic devices, such as digital photo frames, with them when they travel. Typically the photo frames include a stand mounted on the exterior of the frames so that the frames can be positioned upright on a desk or other flat surface. However, externally mounted stands add to the bulk of the frame making them less convenient to carry.

Therefore, it is desirable to provide a support stand assembly for supporting a digital photo frame which can overcome the above-mentioned problem.

DETAILED DESCRIPTION OF THE EMBODIMENTS

Embodiments of the disclosure will now be described in detail with references to the accompanying drawings.

Figure 1:
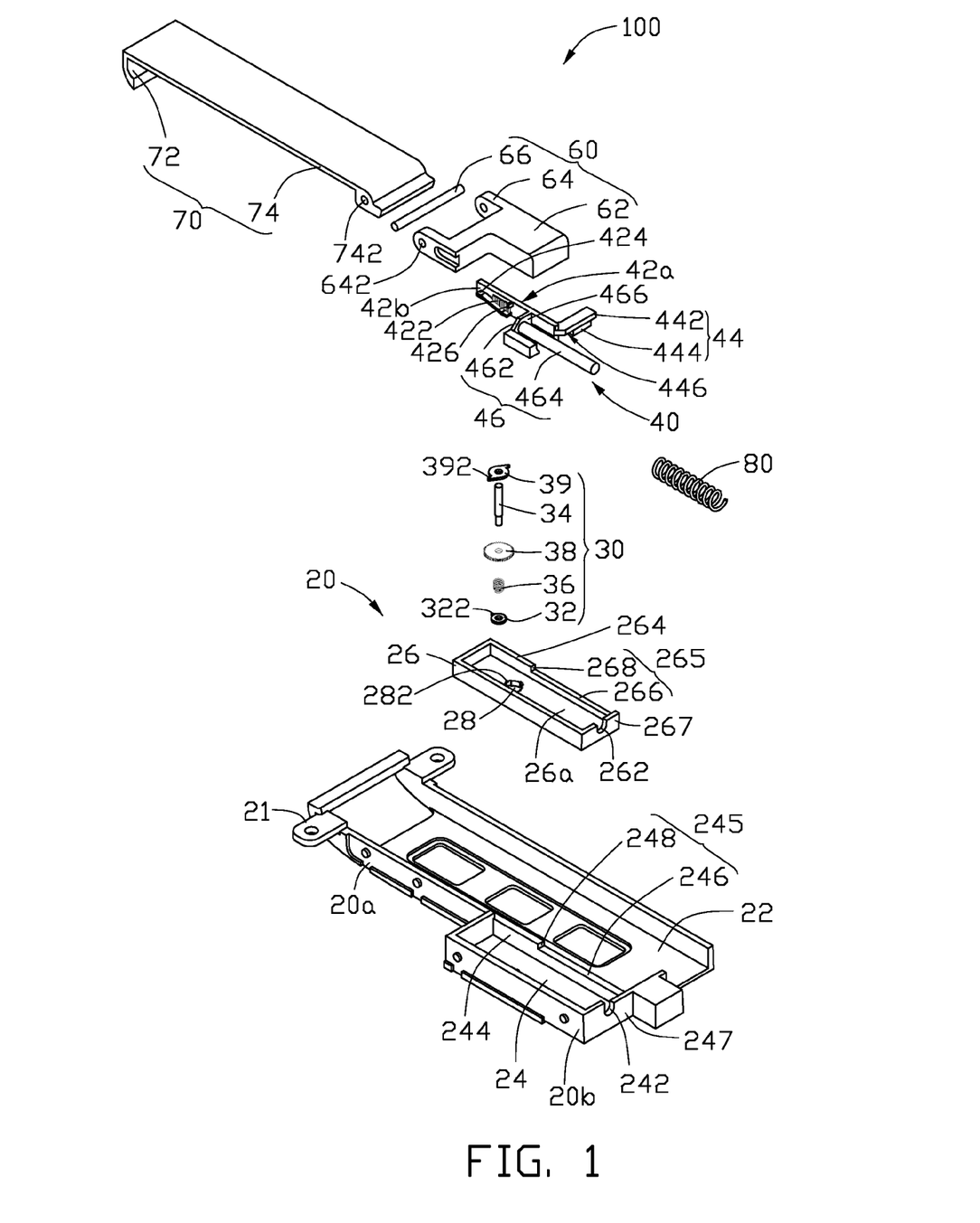
FIG. 1 is an exploded view of a disassembled support stand assembly including a supporting member according to one embodiment.
Figure 2:
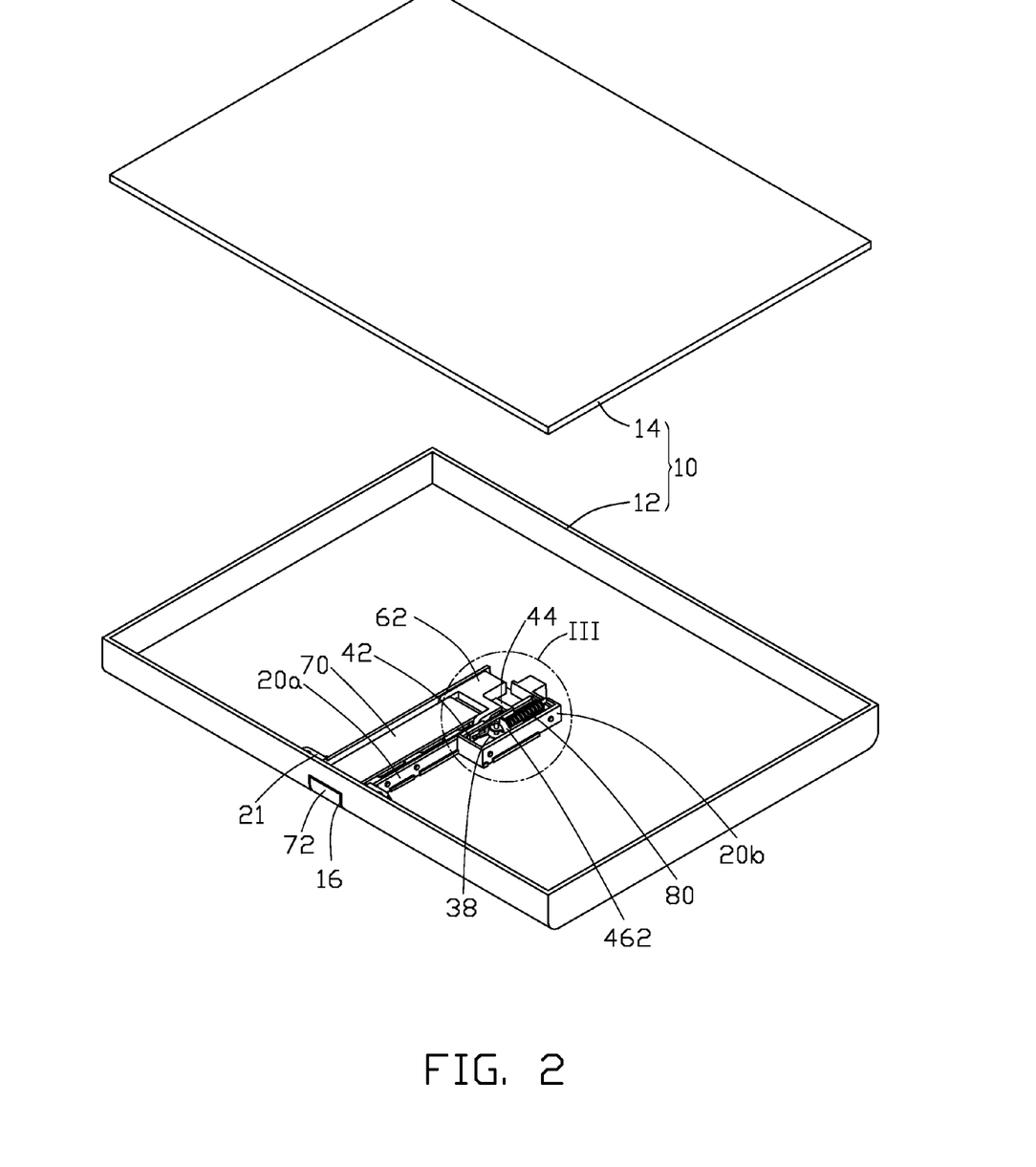
FIG. 2 is an isometric view of the support stand assembly of FIG. 1 received in a digital photo frame.
Figure 3:
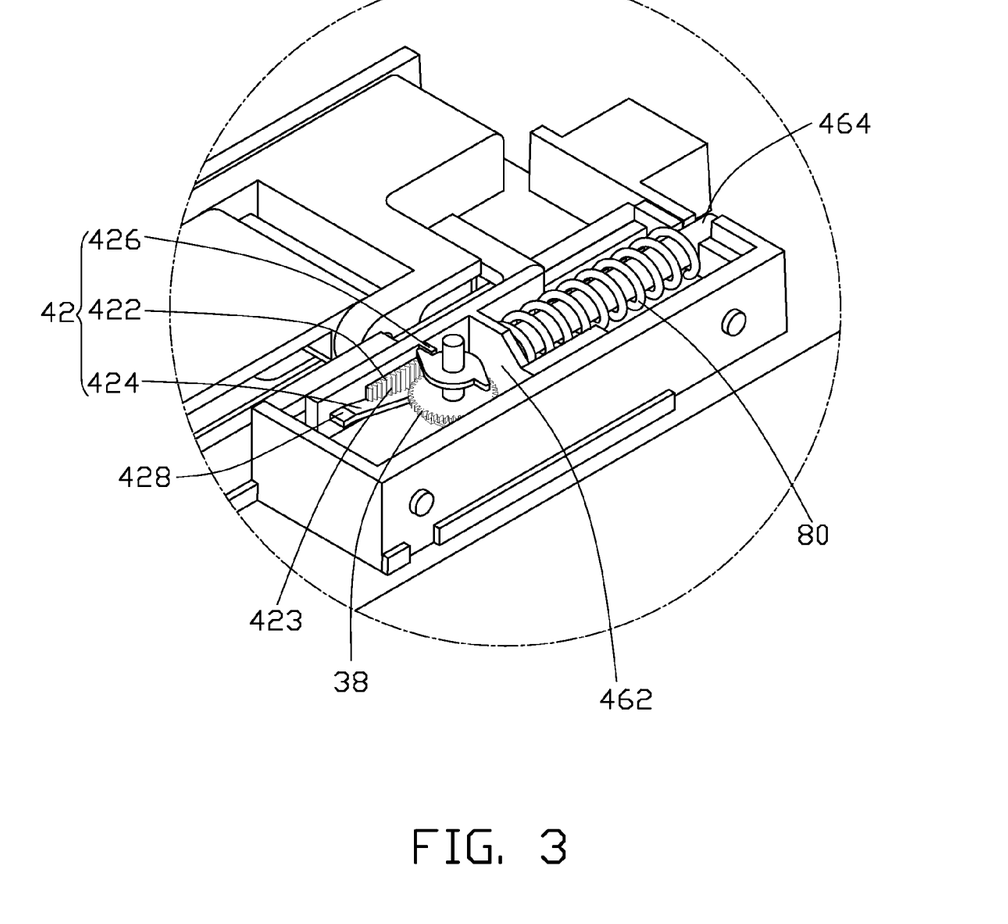
FIG. 3 is an enlarged view of the section of III, shown in FIG. 2.

Referring to FIGS. 1-3, a support stand assembly 100 according to one embodiment is received in a digital photo frame 10 (see FIG. 2). The digital photo frame 10 includes a housing 12 and a displayer 14 received in the housing 12. The housing 12 defines an opening 16 for receiving the support stand assembly 100. The support stand assembly 100 includes a base 20, a stopper 30, a guiding member 40, a connecting member 60, a supporting member 70, and a resilient member 80.

The base 20 includes a first main body 20a and a connecting portion 20b. The connecting portion 20b is disposed on the outside of the first main body 20a. The first main body 20a includes an end portion 21 connected to the sidewall of the opening 16. The connecting portion 20b extends from the first main body 20a along a direction substantially perpendicular to the first main body 20a and away from the end portion 21. In the embodiment, the first main body 20a and the connecting portion 20b are rectangular. A first receiving space 22 is defined in the first main body 20a and configured for receiving the connecting member 60 and the supporting member 70. A second receiving space 24 is defined in the connecting portion 20b and configured for receiving the stopper 30 and the guiding member 40. The first receiving space 22 and the second receiving space 24 share a common first sidewall 244.

A first cutout 245 is defined in the first sidewall 244 to form a first supporting surface 246 and a first resisting surface 248. The first resisting surface 248 is substantially perpendicular to the first supporting surface 246. The first supporting surface 246 is parallel to the bottom of the second receiving space 24. A first recess 242 is defined in a second sidewall 247 of the second receiving space 24, which is adjacent to the first sidewall 244 and away from the end portion 21 of the first body 20a.

To protect the connecting portion 20b from being damaged by the stopper 30, a liner 26 is disposed in the second receiving space 24. A third receiving space 26a is defined in the liner 26. A first through hole 28 is defined in the bottom of the third receiving space 26a. Four latching notches 282 are defined in the sidewall of the first through hole 28. In the embodiment, the four latching notches 282 are evenly spaced from each other. It is to be noted that although four latching notches 282 are exemplarily illustrated herein, less or more four latching notches 282 may be optionally adopted in the support stand assembly 100 in other alternative embodiments by those of ordinary skill in the art and therefore be within the scope thereof. Also, the arrangement/layout of the four latching notches 282 are not limited by this embodiment.

A second cutout 265 is defined in a third sidewall 264 of the liner 26 corresponding to the first cutout 245 to form a second supporting surface 266 corresponding to the first supporting surface 246 and a second resisting surface 268 corresponding to the first resisting surface 248. When the liner 26 is received in the second receiving space 24 of the connecting portion 20b, the third sidewall 264 is against the first sidewall 244 so that the second cutout 265 is adjacent to the first cutout 245. A second recess 262 is defined in a fourth sidewall 267 of the third receiving space 26a corresponding to the first recess 242. The fourth sidewall 267 is adjacent to the third sidewall 264. Referring to FIG. 3, when liner 26 is received in the second receiving space 24, the fourth sidewall 267 is adjacent to the second sidewall 247 of the connecting portion 20b.

The stopper 30 includes a first cam 32 with a latching protrusion 322, a shaft 34, an elastic member 36, a gear 38, and a second cam 39 with two stopping protrusions 392. The shaft 34 is securely connected to the first cam 32. The elastic member 36 is sleeved around the shaft 34. In the embodiment, the elastic member 36 is a spring. The gear 38 is movably connected to the shaft 34 above the elastic member 36. When the elastic member 36 is not compressed, the gear 38 is placed over the shaft 34 at an initial position. The gear 38 can move along the shaft 34 in an up and down direction as the elastic member 36 compresses and expands. When the gear 38 is rotated, the shaft 34 is driven to rotate by the gear 38. The second cam 39 is securely connected to the shaft 34 above the gear 38.

When the stopper 30 is received in the third receiving space 26a of the liner 26, the latching protrusion 322 of the first cam 32 latches with the latching notches 282 of the first through hole 28 when rotated in one direction. In the embodiment, when the shaft 34 is driven to rotate counter-clockwise, the latching protrusion 322 of the first cam 32 latches with the latching notches 282, when the shaft 34 is driven to rotate clockwise, the latching protrusion 322 of the first cam 32 disengages from the latching notches 282.

The guiding member 40 includes a second main body 42, a first resisting portion 44, and a positioning portion 46. The second main body 42 includes a first surface 42a and an opposite second surface 42b. The first resisting portion 44 extends from an end of the first surface 42a of the second main body 42 along a direction substantially perpendicular to the surface 42a. The positioning portion 46 is disposed on an end of the second surface 42b of the second main body 42 corresponding to the first resisting portion 44.

Referring to FIG. 3, the second main body 42 includes a rack 422, a supporting board 424, and a stopping block 426. The rack 422, the supporting board 424 and the stopping block 426 are disposed on the other end of the surface 42b of the second main body 42 away from the positioning portion 46. The rack 422 is disposed over the supporting board 424. The stopping block 426 is disposed over the rack 422 near the positioning portion 46 and extends from the second surface 42b of the main body 42 along a direction substantially perpendicular to the second surface 42b. The rack 422 includes a number of teeth 423. The length of each tooth 423 diminishes gradually in a direction away from the positioning portion 46. The supporting board 424 has a moderately inclined plane 428 facing the rack 422. The gradient of the inclined plane 428 diminishes gradually in the direction away from the positioning portion 46 corresponding to the gradient of the rack 422.

The first resisting portion 44 includes a resisting block 442 and a sliding block 444. The resisting block 442 includes a surface 446 facing the second supporting surface 266 of the cutout 265. The sliding block 444 extends from the surface 446 along a direction substantially perpendicular to the surface 446. When the guiding member 40 is received in the third receiving space 26a of the liner 26, the resisting block 442 is received in the third receiving space 26a and extended into the first receiving space 22 of the first main body 20a, and the sliding block 444 is placed on the first supporting surface 246 of the first cutout 245 and the second supporting surface 266 of the second cutout 265 for assisting the guiding member 40 to slide along the second supporting surface 266.

The positioning portion 46 includes a side panel 462 and a post 464. The side panel 462 is disposed on an end of the surface 42b of the second main body 42 and extended from the surface 42b along a direction substantially perpendicular to the second surface 42b. In the embodiment, the side panel 462 is integrally formed with the second main body 42. The side panel 462 includes a surface 466 facing the second recess 262 of the liner 26. The post 464 is disposed on the surface 466 of the side panel 462 and extended from the surface 466 along a direction substantially perpendicular to the surface 466. When the guiding member 40 is received in the third receiving space 26a of the liner 26, the post 464 is matched with the first and second recesses 242 and 262 and is projected from the recesses 242, 262 for making the guiding member 40 move in the second receiving space 24. The resilient member 80 is sleeved around the post 464.

To ensure the guiding member 40 slides smoothly along the second supporting surface 266 of the first cutout 265 without deflection, a positioning block 466 is disposed on the end portion of the side panel 462 away from the second main body 42. When the guiding member 40 is received in the third receiving space 26a of the liner 26, the positioning block 466 is pressed against one sidewall of the third receiving space 26a.

The connecting member 60 includes a second resisting portion 62, two arms 64, and a pivot 66. The arms 64 are disposed on two opposite sides of an end portion of the second resisting portion 62. The arms 64 and the second resisting portion 62 cooperatively form an "h" shape. Two second through holes 642 are respectively defined on the two arms 64 and configured for the pivot 66 running therethrough and the supporting member 70 to connect the connecting member 60 to supporting member 70.

The supporting member 70 includes a pressing portion 72 corresponding to the opening 16 and a twisting portion 74 far away from the pressing portion 72. A third through hole 742 is defined in the twisting portion 74 corresponding to the second through holes 642. The connecting member 60 is pivotally connected to the supporting member 70 via the pivot 66 being extended through the second through holes 642 and the third through hole 742. When the connecting member 60 and the supporting member 70 are received in the first receiving space 22 of the first main body 20a, the second resisting portion 62 is abutted against the resisting block 442 of the first resisting portion 44.

Referring to FIG. 3, when the support stand assembly 100 is not in use, the supporting member 70 is received in the digital photo frame 10. The liner 20 is received in the second receiving space 24 of the connecting portion 20b. The stopper 30 is matched with the liner 20 via the latching protrusion 322 of the first cam 32 latched with the latching notches 282. The guiding member 40 is received in the liner 20, and the stopping block 426 is resisted with the stopping protrusion 392 of the second cam 39 to prevent the guiding member 40 from moving. The sliding block 444 is disposed on the second supporting surface 266 of the first cutout 265.

Figure 4:
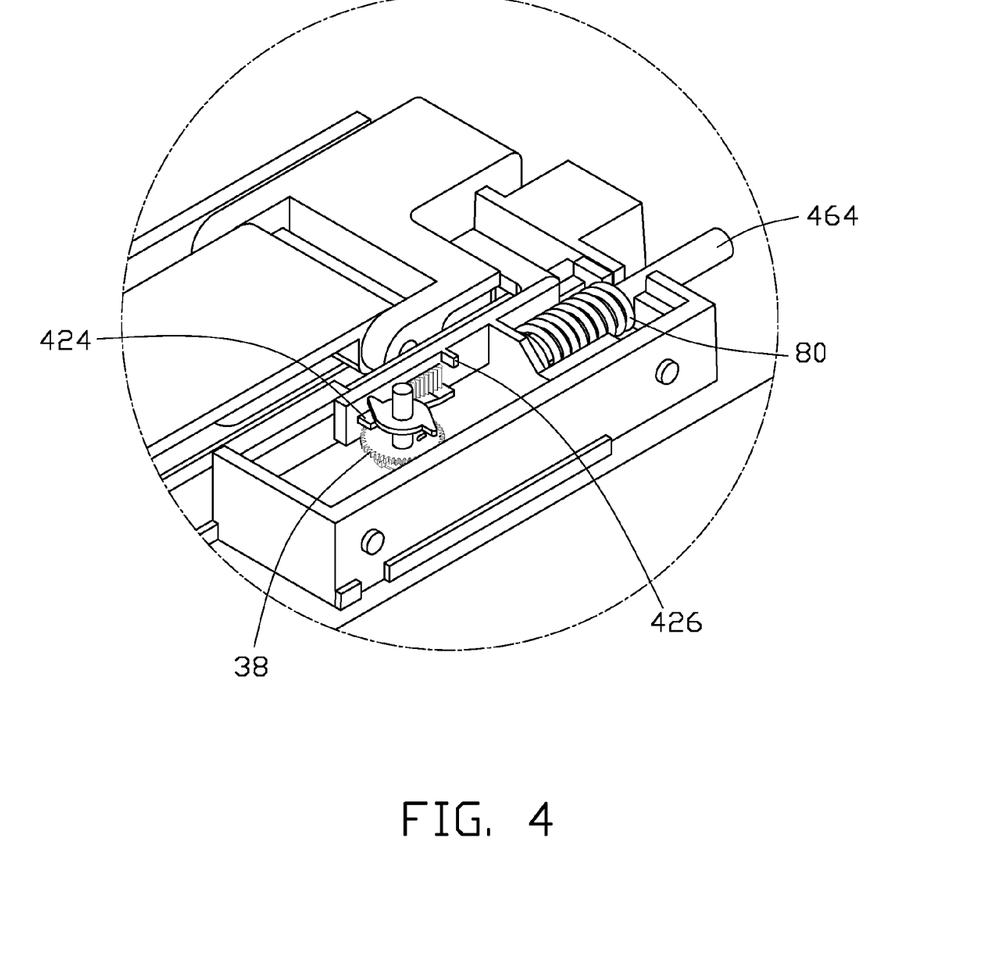
FIG. 4 is similar to FIG. 3, but showing the support stand assembly of FIG. 1 is pressed in a different state.

Referring to FIG. 4, when the support stand assembly 100 is required for use, the pressing portion 72 of the supporting member 70 is pressed to push the connecting member 60 to slide along the first receiving space 22 of the first main body 20a. The second resisting portion 62 of the connecting member 60 pushes the first resisting portion 44 of the guiding member 40 to drive the sliding block 444 of the first resisting portion 44 to slide along the second supporting surface 266 of first cutout 265 toward a direction away from the end portion 21 of the first main body 20a. The rack 422 drives the gear 38 to rotate clockwise, therefore the shaft 34, the first cam 32, the second cam 39 are driven to rotate clockwise by the gear 38, and the resilient member 80 is pressed by the side panel 462.

After the first cam 32 and the second cam 39 are rotated clockwise to about 90 degrees, the gear 38 disengages from the end portion of the rack 422, the stopping block 426 disengages from the stopping protrusion 392, and the gear 38 contacts with the moderately inclined plane 428 of the supporting board 424. The gradient of the inclined plane 428 diminishing gradually in the direction away from the positioning portion 46 results in the gear 38 moving upwards along the shaft 34. The gear 38 can slide along the shaft 34 toward a direction near the first cam 32 to an initial position when the gear 38 is not supported by the supporting board 424.

When the pressing portion 72 of the supporting member 70 is released, the resilient member 80 resists against the side panel 462 of the position portion 46 to drive the guiding member 40 to move in the third receiving space 26a towards a direction near the end portion 21 of the first main body 20a. The supporting board 424 resists against the gear 38 causing the gear 38 to press the elastic member 36 down. The gradient of the inclined plane 428 diminishing gradually in the direction away from the positioning portion 46 results in the gear 38 moving downwards along the shaft 34 toward a direction near the first cam 32 and away from the initial position, until the stopping protrusion 392 contacts with the stopping block 426. The gear 38 is disengaged from the supporting board 424 causing the gear 38 slide upwards along the shaft 34 toward a direction away from the first cam 32 to the initial position.

Figure 5:
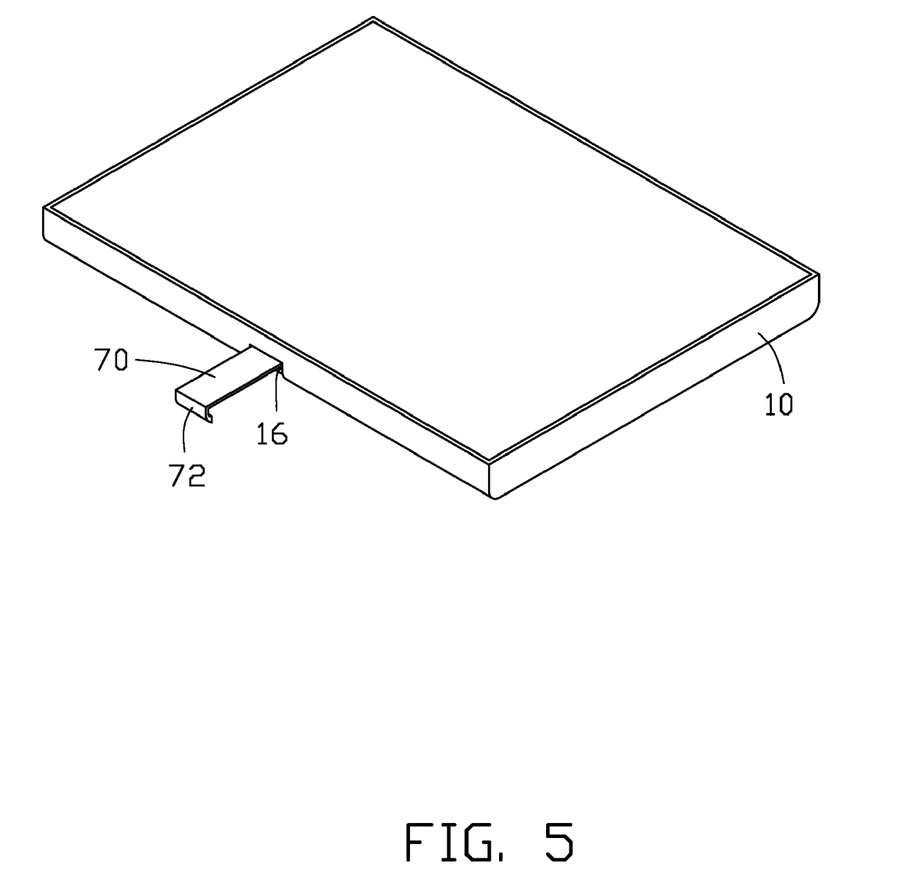
FIG. 5 is an isometric view of the supporting member of the support stand assembly of FIG. 1 sprung out from the digital photo frame.
Figure 6:
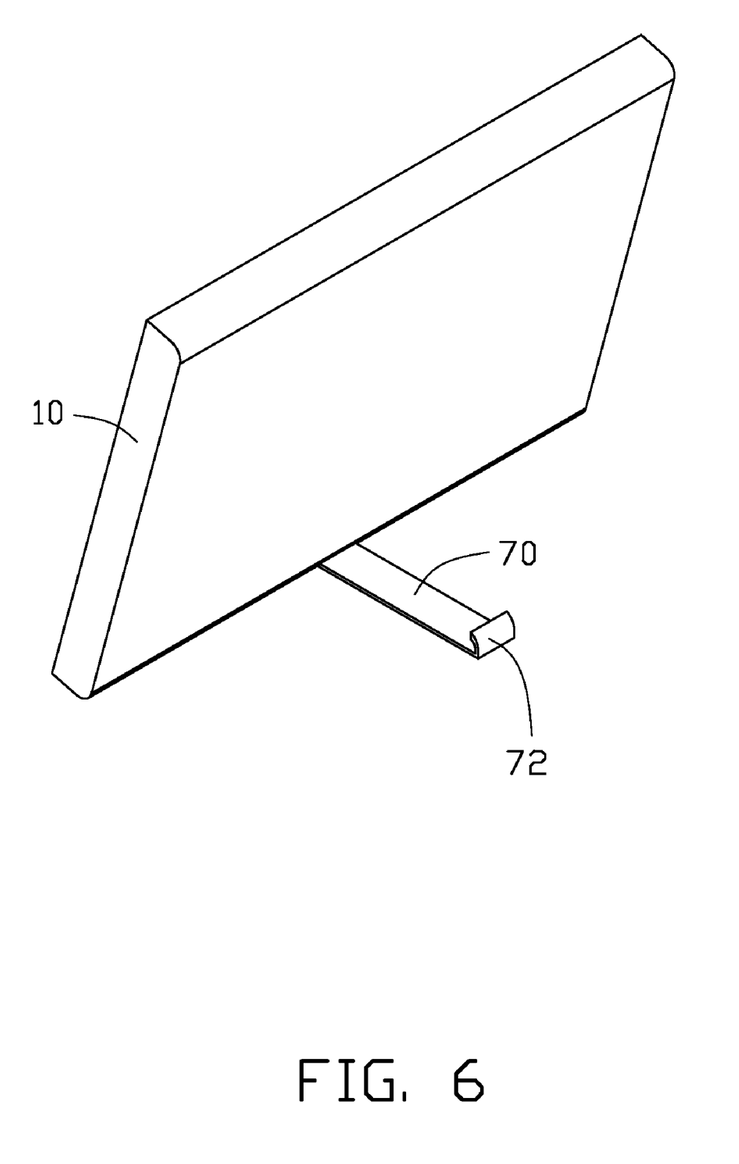
FIG. 6 is an isometric view of the support stand assembly of FIG. 1 supported by the supporting member.

After the resisting block 442 of the guiding member 40 is resisted with the resisting surface 266 of the first cutout 265, the end portion of the pressing portion 72 is ejected from the opening 16 (See FIG. 5). Therefore the supporting member 70 can be pulled out from the opening 16 and rotated to an angle relative to the connecting member 60 so that the supporting member 70 can be used as shown in FIG. 6 to support the digital photo frame 10.

When the support stand assembly 100 is not need, the supporting member 70 is pushed back into the digital photo frame 10. The pressing portion 72 of the supporting member 70 is pressed to make the rack 422 of the second main body 42 engage with the gear 38. The rack 422 drives the gear 38 to rotate clockwise, until the first cam 32 is latched with the latching notches 282 of the liner 26. When the shaft 38 has rotated to about 90 degrees, the stopping protrusion 392 resists against the stopping block 426 of the guiding member 40, therefore the guiding member 40 cannot move. Thus, the supporting member 70 is received in the digital photo frame 10.

The supporting member 70 can be pulled out of the digital photo frame 10 for supporting the digital photo frame 10 and pushed into the digital photo frame 10 for carrying conveniently. Therefore the support stand assembly 100 is compact in structure and convenient for users to carry.

It is to be understood, however, that even though numerous characteristics and advantages of the embodiments have been set forth in the foregoing description, together with details of the structures and functions of the embodiments, the disclosure is illustrative only, and changes may be made in detail, especially in matters of arrangement of parts within the principles of the invention to the full extent indicated by the broad general meaning of the terms in which the appended claims are expressed.

What is claimed is:

1. A support stand assembly comprising:
    a base;
    a stopper rotatably disposed in the base and being rotatable between a first position and a second position;
    a guiding member engaged with the stopper and movably disposed in the base;
    a resilient member disposed between the guiding member and the base;
    a connecting member abutting against the guiding member and movably disposed in the base; and
    a supporting member pivotally connected with the connecting member and movably disposed on the base;
    wherein the stopper comprises a cam member, the cam member engages the guiding member and prevents the guiding member from moving when the stopper is positioned in the first position, and the cam member disengages from the guiding member and allows the guiding member to move when the stopper is positioned in the second position.

2. The support stand assembly of claim 1, wherein the base comprises a first main body, and a first receiving space being defined in the first main body, the connecting member and the supporting member being movably disposed on a bottom of the first receiving space.

3. The support stand assembly of claim 2, wherein the base further comprises a connecting portion, the connecting portion extending from the first main body along a direction substantially perpendicular to the first main body, a second receiving space being defined in the connecting portion, and the stopper being rotatably being disposed on the bottom of the second receiving space.

4. The support stand assembly of claim 3, further comprising a liner received in the second receiving space of the connecting portion, wherein a third receiving space is defined on the liner, a first through hole being disposed on the bottom of the third receiving space, four latching notches being defined in the sidewall of the first through hole, the stopper comprising a first cam with a latching protrusion, and the latching protrusion of the first cam latching with the latching notches when rotated in one direction.

5. The support stand assembly of claim 4, wherein the four latching notches are evenly spaced from each other.

6. The support stand assembly of claim 4, wherein the stopper further comprises a shaft, the shaft being matched with the first cam and capable of rotating.

7. The support stand assembly of claim 6, wherein the stopper further comprises an elastic member, the elastic member being sleeved around the shaft.

8. The support stand assembly of claim 7, wherein the elastic member is a spring.

9. The support stand assembly of claim 7, wherein the stopper further comprises a gear, the gear being movably connected to the shaft above the elastic member.

10. The support stand assembly of claim 4, wherein the guiding member comprises a second main body, a first resisting portion, and a positioning portion, the second main body comprising a first surface and a second surface opposite the first surface, the positioning portion being disposed on an end of the first surface of the second main body, and the first resisting portion extending from an end of the second surface of the second main body along a direction substantially perpendicular to the second surface.

11. The support stand assembly of claim 10, wherein the second main body comprises a rack and a supporting board, the rack comprising a number of teeth, the length of each tooth diminishing gradually in a direction away from the positioning portion of the guiding member, the supporting board comprising an inclined plane facing the rack, and the gradient of the inclined plane diminishing gradually in the direction away from the positioning portion of the guiding member correspondingly to a gradient of the rack.

12. The support stand assembly of claim 11, wherein the second main body further comprises a stopping block, the stopping block being disposed over the rack and extended from the first surface of the second main body along a direction substantially perpendicular to the first surface.

13. The support stand assembly of claim 10, wherein the first receiving space and the second receiving space share a common first sidewall, a first cutout being defined in the first sidewall, a second cutout being defined in a third sidewall of the third receiving space corresponding to the first cutout, and the third sidewall of the third receiving space being close to the first sidewall.

14. The support stand assembly of claim 13, wherein the first cutout comprises a first supporting surface parallel to the bottom of the second receiving space, the second cutout comprising a second supporting surface corresponding to the first supporting surface, the first resisting portion comprising a resisting block and a sliding block, the resisting block comprising a surface facing the first supporting surface of the first cutout, the sliding block being extended from the surface of the resisting block along a direction substantially perpendicular to the surface and placed on the first supporting surface of the first cutout and the second supporting surface of the second cutout, and the resisting block being received in the third receiving space and extended into the first receiving space of the first main body.

15. The support stand assembly of claim 14, wherein the connecting member comprises a second resisting portion and two arms, the second resisting portion abutting against the resisting block of the first resisting portion, the arms being disposed on two opposite sides of an end portion of the second resisting portion, and the arms and the second resisting portion cooperatively forming an h shape.

16. The support stand assembly of claim 15, wherein the connecting member further comprises a pivot, two second through holes being defined in the arms corresponding to the pivot, the supporting member comprising a pressing portion and a twisting portion away from the pressing portion, the twisting portion defining a third through hole corresponding to the pivot, and the connecting member being pivotally connected to the supporting member via the pivot being extended through the second through holes and the third through hole.

17. The support stand assembly of claim 10, wherein the positioning portion comprises a side panel and a post, the side panel being disposed on the second surface of the second main body and extended from an end of the second surface along a direction substantially perpendicular to the second surface, the side panel comprising a surface facing the first recess, the post being disposed on the surface of the side panel and extended from the surface along a direction substantially perpendicular to the surface and near the resisting portion, and the resilient member being sleeved around the post.

18. A digital photo frame comprising:
a housing defining an opening; and
a support stand assembly received in the opening of the housing, comprising:
a base;
a stopper rotatably disposed in the base and being rotatable between a first position and a second position;
a guiding member engaged with the stopper and movably disposed in the base;
a resilient member disposed between the guiding member and the base;
a connecting member abutting against the guiding member and movably disposed in the base; and
a supporting member pivotally connected with the connecting member and movably disposed on the base;
wherein the stopper comprises a cam member, the cam member engages the guiding member and prevents the guiding member from moving when the stopper is positioned in the first position, and the cam member disengages from the guiding member and allows the guiding member to move when the stopper is positioned in the second position.

19. The digital photo frame according to claim 18, wherein the stopper further comprises a rotatable shaft and a gear, the cam member is fixed to the shaft, the gear is movably connected to the shaft, and the guiding member comprises a rack and a supporting board, and when the gear rests on the supporting board, the gear engages the rack, and when the gear is under the rack, the gear disengages from the rack.

20. The digital photo frame according to claim 19, wherein the rack comprises a number of teeth, the length of each tooth diminishes gradually along a movement direction of the guiding member, the supporting board comprises an inclined plane facing the rack, and the gradient of the inclined plane diminishes gradually along the movement direction of the guiding member correspondingly to a gradient of the rack.

* * * * *